United States Patent
Liu et al.

(10) Patent No.: US 9,876,270 B2
(45) Date of Patent: Jan. 23, 2018

(54) ANTENNA STRUCTURE, ELECTRONIC DEVICE USING SAME, AND METHOD FOR MAKING SAME

(71) Applicants: SHENZHEN FUTAIHONG PRECISION INDUSTRY CO., LTD., Shenzhen (CN); FIH (HONG KONG) LIMITED, Kowloon (HK)

(72) Inventors: Xu Liu, Shenzhen (CN); Yi Yang, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 121 days.

(21) Appl. No.: 14/570,600

(22) Filed: Dec. 15, 2014

(65) Prior Publication Data

US 2015/0236402 A1 Aug. 20, 2015

(30) Foreign Application Priority Data

Feb. 17, 2014 (CN) .......................... 2014 1 0052060

(51) Int. Cl.
| | | |
|---|---|---|
| H01Q 1/24 | (2006.01) | |
| C23C 28/02 | (2006.01) | |
| H01Q 1/38 | (2006.01) | |
| C25D 5/12 | (2006.01) | |
| C25D 7/00 | (2006.01) | |
| B29L 31/34 | (2006.01) | |
| B29K 101/00 | (2006.01) | |

(52) U.S. Cl.
CPC ............ *H01Q 1/243* (2013.01); *C23C 28/023* (2013.01); *C25D 5/12* (2013.01); *C25D 7/00* (2013.01); *H01Q 1/38* (2013.01); *B29K 2101/00* (2013.01); *B29L 2031/3456* (2013.01)

(58) Field of Classification Search
CPC .................................. H01Q 1/243; H01Q 1/38
See application file for complete search history.

(56) References Cited

U.S. PATENT DOCUMENTS

| | | | | |
|---|---|---|---|---|
| 2004/0135730 A1* | 7/2004 | Yang | ..................... | G06F 1/1616 343/702 |
| 2008/0084355 A1* | 4/2008 | Kuraoka | ................ | H01Q 1/242 343/702 |
| 2011/0304517 A1* | 12/2011 | Fan | ......................... | H01Q 1/405 343/872 |
| 2012/0306704 A1* | 12/2012 | Li | .......................... | H01Q 1/243 343/702 |

FOREIGN PATENT DOCUMENTS

| | | |
|---|---|---|
| CN | 2665949 Y | 12/2004 |
| CN | 101246989 A | 8/2008 |
| CN | 102891359 A | 1/2013 |
| CN | 103367895 A | 10/2013 |
| TW | M379183 U1 | 4/2010 |
| TW | M383827 U1 | 7/2010 |

\* cited by examiner

*Primary Examiner* — Dieu H Duong
(74) *Attorney, Agent, or Firm* — ScienBiziP, P.C.

(57) ABSTRACT

An antenna structure includes a carrier and an antenna coupled to the carrier. The carrier has at least one end, at least one fixing hole formed on the end of the carrier, and at least one groove formed in the middle of the carrier. A manufacture method of the antenna structure and an electronic device using the antenna structure are also provided.

9 Claims, 6 Drawing Sheets

ANTENNA STRUCTURE, ELECTRONIC DEVICE USING SAME, AND METHOD FOR MAKING SAME

FIELD

The subject matter herein generally relates to an antenna structure, an electronic device using the antenna structure, and a method for making the antenna structure.

BACKGROUND

Antennas are widely used for electronic devices. Recently, a popular method of manufacturing an antenna involves using a laser direct structuring process. Laser direct structuring process provides an injection molded base of a material that can be selectively activated by a laser. Thus, the laser would be used to selectively activate the material with the radiation pattern desired. The laser direct structuring method also has some disadvantages. For example, laser direct structuring material is relatively expensive and has less advantageous material properties.

Therefore, there is room for improvement within the art.

BRIEF DESCRIPTION OF THE FIGURES

Implementations of the present technology will now be described, by way of example only, with reference to the attached figures.

DETAILED DESCRIPTION

Figure 1:
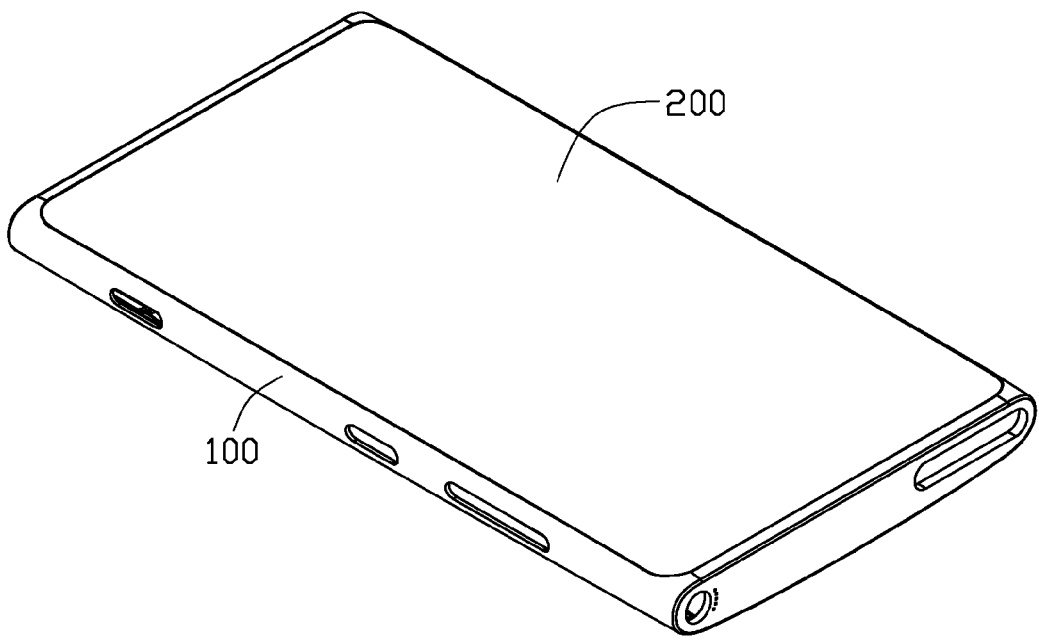
FIG. 1 is an isometric view of an electronic device, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be present. The term "comprising," when utilized, means "including, but not necessarily limited to"; it specifically indicates open-ended inclusion or membership in the so-described combination, group, series and the like.

FIG. 1 illustrates an electronic device 300 according to an exemplary embodiment. The electronic device 300 can be a mobile phone, a personal digital assistant or a panel computer. The electronic device 300 includes a housing 100 and a display screen 200 mounted on the housing 100.

Figure 2:
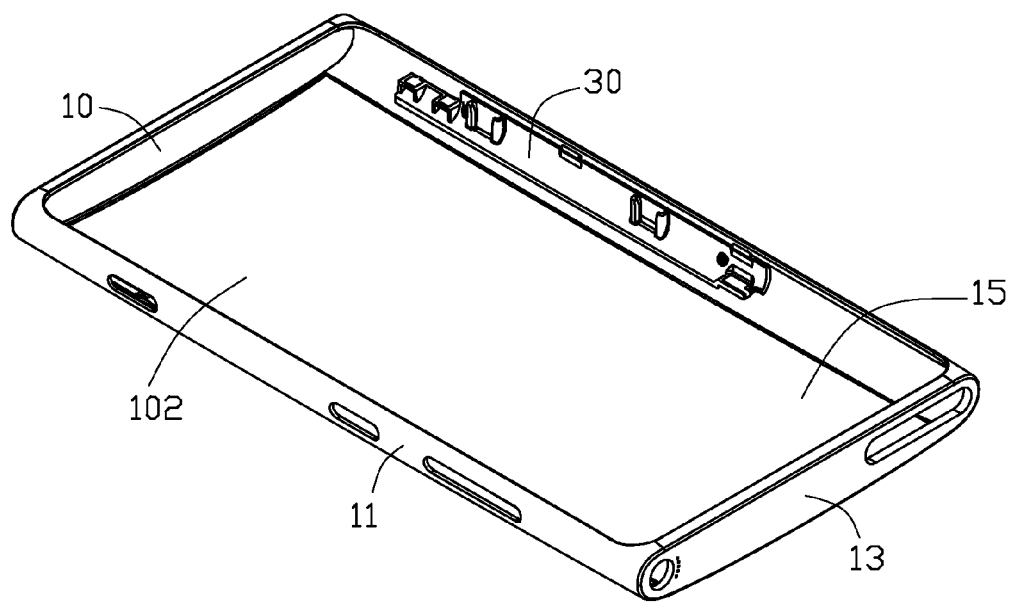
FIG. 2 is an isometric view of a housing of the electronic device shown in FIG. 1.

FIG. 2 illustrates that the housing 100 can include a base 10 and an antenna structure 30 located in the base 10.

The base 10 includes two opposite side walls 11, two opposite end walls 13 and a bottom wall 15. The side walls 11, the end walls 13 and the bottom wall 15 cooperatively form a cavity 102. The cavity 102 can be used to receive a battery (not shown) and a circuit board (not shown).

Figure 3:
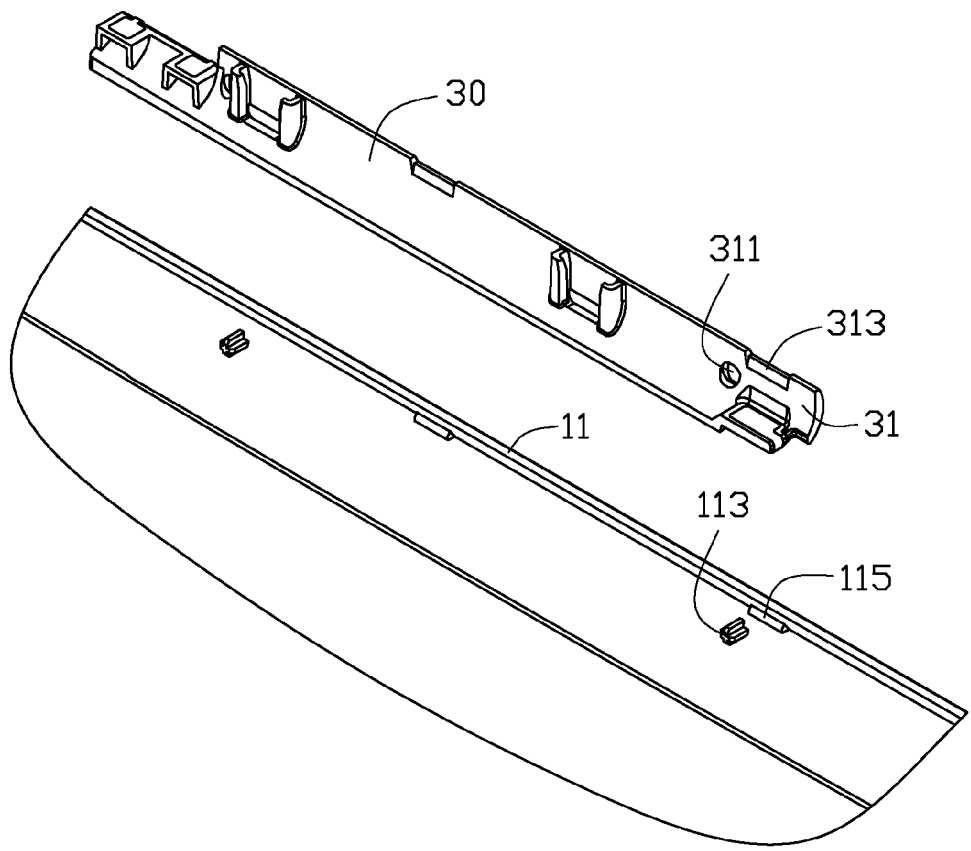
FIG. 3 is an exploded, isometric view of the housing shown in FIG. 2.

FIG. 3 illustrates that one side wall 11 can have at least one fixing member 113 and at least one latch member 115. In at least one exemplary embodiment, the side wall 11 has two fixing members 113, and two latch members 115. The two fixing members 113 can be respectively located on the two opposite ends of the side wall 11. The latch members 115 can be located on an edge position of the side wall 11.

Figure 4:
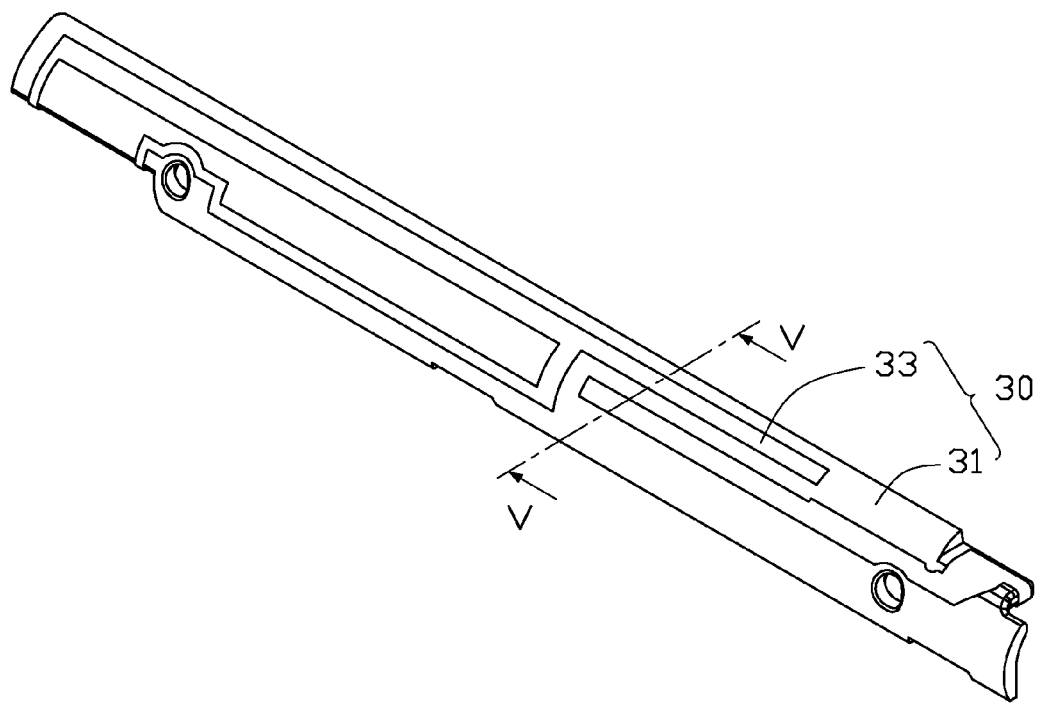
FIG. 4 is an isometric view of an antenna structure, according to an exemplary embodiment.

FIGS. 3-4 illustrate that the antenna structure 30 can be fixed on the side wall 11 having the fixing members 113 and the latch members 115, and received in the cavity 102. The antenna structure 30 includes a carrier 31 and an antenna 33 located on the carrier 31. The carrier 31 can be made of plastic or resin.

The carrier 31 has at least one fixing hole 311 and at least one groove 313. In at least one exemplary embodiment, the carrier 31 has two fixing holes 311 and two grooves 313. The fixing holes 311 can be respectively formed on the two opposite ends of the carrier 31. The fixing members 113 can be respectively received in the fixing holes 311. The grooves 313 can be formed in the middle of a circumference of the carrier 31. When the fixing members 113 are respectively received in the fixing holes 311, the latch members 115 can be respectively latched with the grooves 313; thereby the antenna structure 30 can be fixed in the base 10.

Figure 5:
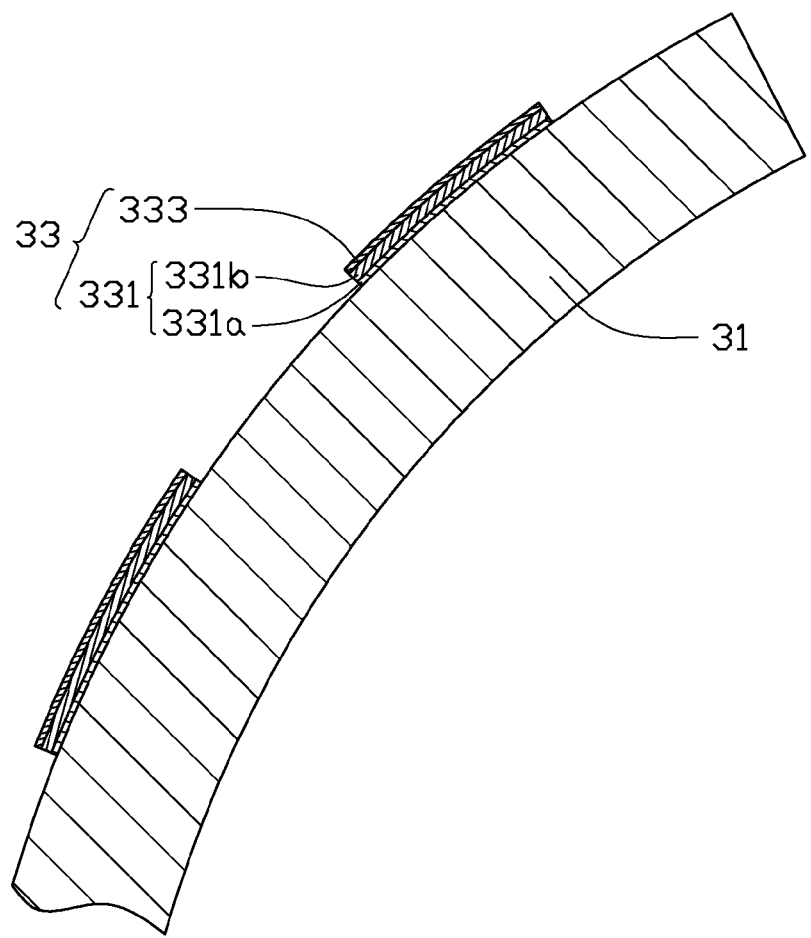
FIG. 5 is a cross-sectional view of an antenna structure along line V-V of FIG. 4.

FIG. 5 illustrates that the antenna 33 can include at least one copper layer 331 and a nickel layer 333 formed on the copper layer 331. The thickness of the copper layer 331 can be about 11 um to about 15 um. The thickness of the nickel layer 333 can be about 2 um to about 5 um. In at least one exemplary embodiment, the copper layer 331 includes a first copper layer 331a and a second copper layer 331b formed on the first copper layer 331a by plating. The first copper layer 331a can be formed on a surface of the carrier 31 facing the cavity 102 by an evaporation process. The first copper layer 331a has good conductivity, so the first copper layer 331a can be used as an antenna. The thickness of the first copper layer 331a can be about 3 um to about 5 um. The thickness of the second copper layer 331b can be about 8 um to about 10 um. The second copper layer 331b can provide the thickness required of the antenna 33, and plays the main role of the antenna 33. The nickel layer 333 can be deposited on the second copper layer 331b by an electronic plating process, and the nickel layer 333 can protect the second copper layer 331b from being damaged.

When mounting the electronic device 300, the fixing members 113 are respectively received in the fixing holes 311, and the latch members 115 are respectively latched with the grooves 313; thereby the antenna structure 30 can be fixed in the base 10. The antenna 33 is facing the side wall 11 having the fixing pole 113 and the latch member 115, so that the antenna 33 can be protect from being damaged. The display screen 200 is received in the cavity 102.

Figure 6:
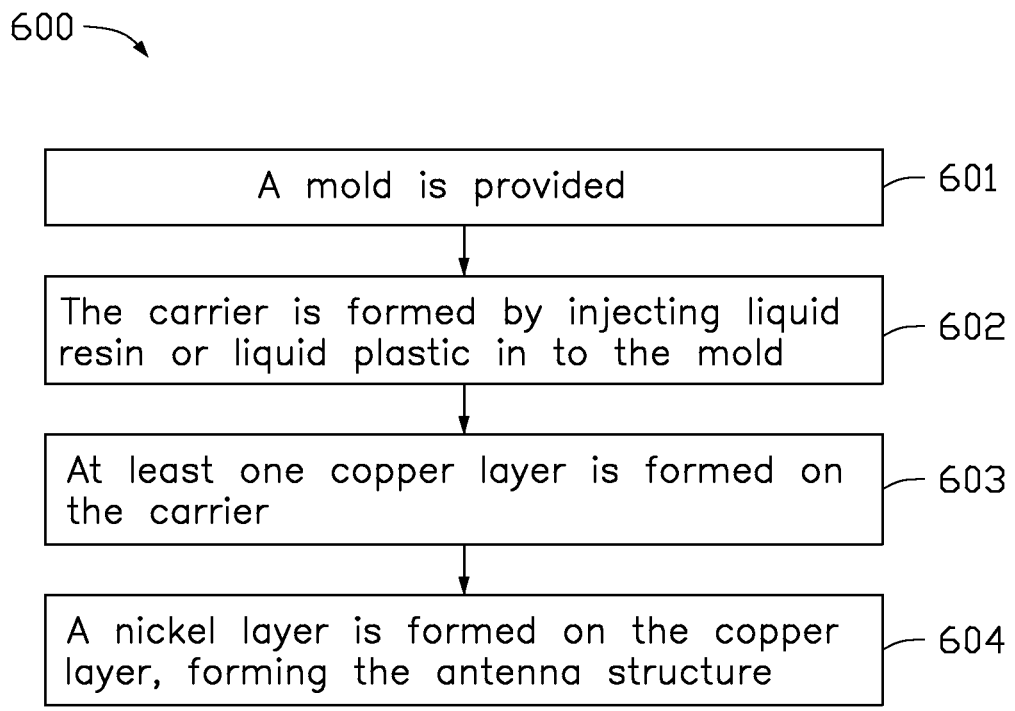
FIG. 6 is a flow chart of a method for making an antenna structure in accordance with an exemplary embodiment.

Referring to FIG. 6, a flowchart is presented in accordance with an example embodiment. The example method 600 is provided by way of example, as there are a variety of ways to carry out the method. The method 600 described below can be carried out using the configurations illustrated in FIGS. 1-5, for example, and various elements of these figures are referenced in explaining example method 600. Each block shown in FIG. 6 represents one or more processes, methods or subroutines, carried out in the example method 600. Furthermore, the illustrated order of blocks is illustrative only and the order of the blocks can change according to the present disclosure. Additional blocks may be added or fewer blocks may be utilized, without departing from this disclosure. The example method 600 of making the antenna structure 30 can begin at block 601.

At block 601 a mold (not shown) is provided, the mold has the required shape and size of the carrier 31.

At block 602 the carrier 31 is formed by injecting liquid resin or liquid plastic in to the mold. The carrier 31 has two fixing holes 311 and two grooves 313. The fixing holes 311 can be formed on the two opposite ends of the carrier 31, respectively. The grooves 313 can be formed in the middle of a circumference of the carrier 31.

At block 603 at least one copper layer 331 is formed on the carrier 31. The copper layer 331 includes a first copper layer 331a and a second copper layer 331b. A copper layer is formed on the carrier 31 by an evaporating method. Then sections of a portion of the copper layer are removed by an etching technology according to the shape of the antenna 33, forming the first copper layer 331a. The thickness of the first copper layer 331a can be about 3 um to about 5 um. The second copper layer 331b can be formed on the first copper layer 331a by electronic plating. The thickness of the second copper layer 331b can be about 8 um to about 10 um.

At block 604 a nickel layer 333 is formed on the second copper layer 331b by electronic plating, forming the antenna structure 30. The thickness of the nickel layer 333 can be about 2 um to about 5 um.

It is to be understood, however, that even through numerous characteristics and advantages of the present disclosure have been set forth in the foregoing description, together with details of assembly and function, the disclosure is illustrative only, and changes may be made in detail, including in the matters of shape, size, and arrangement of parts within the principles of the disclosure to the full extent indicated by the broad general meaning of the terms in which the appended claims are expressed.

What is claimed is:

1. An electronic device comprising:
a housing, the housing comprising a base and an antenna structure fixed in the base, the base having one side wall, the side wall having at least one fixing member and at least one latch member, the antenna structure comprising a carrier and an antenna located on the carrier, the carrier being made of plastic or resin, the carrier having at least one fixing hole and at least one groove defined thereon, the fixing member being received in the fixing hole, the latch member being latched with the groove; and
wherein the antenna comprises at least one copper layer and a nickel layer; the copper layer is attached on the carrier by an evaporating method, and the nickel layer is formed on the copper layer by electronic plating; and when the carrier is fixed on the side wall, the antenna is positioned between the carrier and the side wall.

2. The electronic device of claim 1, wherein the side wall has two fixing members located on two opposite ends of the side wall and two latch members latched on an edge position of the side wall, the carrier has two fixing holes defined on the two opposite ends of the carrier, and two grooves are defined in the middle of a circumference of the carrier, the fixing members are respectively received in the fixing holes, the latch members are respectively latched with the grooves.

3. The electronic device of claim 2, wherein the antenna structure is fixed on the side wall having the fixing members and the latch members.

4. The electronic device of claim 1, wherein the housing further comprises another side wall parallel with the side wall, two opposite end walls and a bottom wall, the side walls, the end walls, and the bottom wall cooperatively form a cavity, a battery, the antenna structure and a circuit board are received in the cavity.

5. The electronic device of claim 1, wherein the thickness of the copper layer is about 11 um to about 15 um, the thickness of the nickel layer is about 2 um to about 5 um.

6. The electronic device of claim 5, wherein the copper layer comprises a first copper layer and a second copper layer formed on the first copper layer, the first copper layer is formed on the carrier by an evaporating method, the second copper layer is formed on the first copper layer by electronic plating, and the nickel layer is formed on the second copper layer.

7. The electronic device of claim 6, wherein the thickness of the first copper layer is about 3 um to about 5 um, the thickness of the second copper layer is about 8 um to about 10 um.

8. The electronic device of claim 1, wherein the carrier can be made of resin or plastic.

9. The electronic device of claim 1, wherein the electronic device further comprises a display screen, the display screen is mounted on the housing.

* * * * *